United States Patent
Jacobs et al.

(10) Patent No.: US 7,028,030 B2
(45) Date of Patent: Apr. 11, 2006

(54) CLUSTER CACHING WITH CONCURRENCY CHECKING

(75) Inventors: Dean Bernard Jacobs, Berkeley, CA (US); Rob Woollen, San Francisco, CA (US); Adam Messinger, San Francisco, CA (US); Seth White, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 468 days.

(21) Appl. No.: 10/211,713

(22) Filed: Aug. 2, 2002

(65) Prior Publication Data

US 2003/0046286 A1 Mar. 6, 2003

Related U.S. Application Data

(60) Provisional application No. 60/316,187, filed on Aug. 30, 2001.

(51) Int. Cl.
*G06F 17/30* (2006.01)

(52) U.S. Cl. ............................................. 707/8; 707/10

(58) Field of Classification Search .................. 707/1, 707/2, 3, 4, 5, 6, 7, 8, 9, 10, 202, 101, 102, 707/103, 104.1; 713/156, 201; 370/312, 370/466; 705/1; 395/500; 703/21; 710/8; 719/321, 315; 702/127, 122; 709/237, 238, 709/231, 227, 202, 222; 718/105, 101
See application file for complete search history.

(56) References Cited

U.S. PATENT DOCUMENTS

| | | | |
|---|---|---|---|
| 5,212,793 A | 5/1993 | Donica et al. .............. | 718/105 |
| 5,249,290 A | 9/1993 | Heizer ......................... | 718/105 |
| 5,434,994 A | 7/1995 | Shaheen et al. ............ | 395/500 |
| 5,452,445 A * | 9/1995 | Hallmark et al. .............. | 707/2 |
| 5,761,507 A | 6/1998 | Govett ........................ | 718/101 |
| 5,768,504 A | 6/1998 | Kells et al. .................. | 713/201 |
| 5,774,689 A | 6/1998 | Curtis et al. .................. | 703/21 |
| 5,799,305 A * | 8/1998 | Bortvedt et al. .............. | 707/10 |
| 5,802,291 A | 9/1998 | Balick et al. ................ | 709/227 |
| 5,819,107 A | 10/1998 | Lichtman et al. .............. | 710/8 |
| 5,878,434 A * | 3/1999 | Draper et al. ................ | 707/202 |
| 5,910,180 A | 6/1999 | Flory et al. .................. | 719/321 |
| 5,920,867 A | 7/1999 | Van Huben et al. ......... | 707/101 |
| 5,926,775 A | 7/1999 | Brumley et al. ............. | 702/127 |
| 5,926,816 A * | 7/1999 | Bauer et al. ................... | 707/8 |
| 6,044,367 A | 3/2000 | Wolff ............................. | 707/2 |
| 6,055,243 A | 4/2000 | Vincent et al. ............. | 370/466 |
| 6,088,694 A | 7/2000 | Burns et al. ................... | 707/8 |

(Continued)

*Primary Examiner*—Jeffrey Gaffin
*Assistant Examiner*—Yicun Wu
(74) *Attorney, Agent, or Firm*—Fliesler Meyer LLP (57) ABSTRACT

Concurrency can be maintained in cluster caching when processing an update request on network server that is storing a local copy of a data item. The request can be processed using the local copy of the data item. A predicated update request can be sent to a network database storing the data item, wherein the database can commit the update if the local copy is current with the data item. If the local copy is not current, the network server can request a new copy, process the request using the current copy, and try another predicated request. The process can continue until the update is committed to the database or aborted. Once committed, any other servers in the cluster can be notified that the data item has been updated. Those other servers can drop any local copy of the data item and can request an updated copy of the data item.

42 Claims, 7 Drawing Sheets

U.S. PATENT DOCUMENTS

| | | |
|---|---|---|
| 6,112,304 A | 8/2000 | Clawson .................... 713/156 |
| 6,173,327 B1 | 1/2001 | De Borst et al. ........... 709/231 |
| 6,189,046 B1 | 2/2001 | Moore et al. ............... 719/315 |
| 6,212,556 B1 | 4/2001 | Arunachalam .............. 709/219 |
| 6,243,753 B1 | 6/2001 | Machin et al. .............. 709/227 |
| 6,263,372 B1 | 7/2001 | Hogan et al. ............... 709/237 |
| 6,269,373 B1 | 7/2001 | Apte et al. .................... 707/10 |
| 6,304,882 B1 | 10/2001 | Strellis et al. .............. 707/202 |
| 6,338,089 B1 | 1/2002 | Quinlan ...................... 709/227 |
| 6,343,287 B1 | 1/2002 | Kumar et al. ................... 707/4 |
| 6,351,775 B1 | 2/2002 | Yu .............................. 709/238 |
| 6,411,956 B1 | 6/2002 | Ng .............................. 707/10 |
| 6,453,356 B1 | 9/2002 | Sheard et al. ............... 709/231 |
| 6,466,972 B1 | 10/2002 | Paul et al. ................... 709/222 |
| 6,477,150 B1 | 11/2002 | Maggenti et al. ........... 370/312 |
| 6,484,143 B1 | 11/2002 | Swildens et al. ............... 705/1 |
| 6,505,200 B1 | 1/2003 | Ims et al. ....................... 707/8 |
| 6,539,381 B1 | 3/2003 | Prasad et al. ................. 707/10 |
| 6,542,845 B1 | 4/2003 | Grucci et al. ................ 702/122 |
| 6,757,708 B1 | 6/2004 | Craig et al. ................. 709/203 |
| 2001/0054062 A1 | 12/2001 | Ismael et al. |
| 2002/0188591 A1 | 12/2002 | Santosuosso |
| 2003/0018732 A1 | 1/2003 | Jacobs et al. |
| 2003/0046230 A1 | 3/2003 | Jacobs et al. |
| 2003/0060214 A1 | 3/2003 | Hendrey et al. |
| 2003/0088713 A1 | 5/2003 | Mandal et al. |
| 2004/0230747 A1 | 11/2004 | Ims et al. |

\* cited by examiner

CLUSTER CACHING WITH CONCURRENCY CHECKING

CLAIM OF PRIORITY

This application claims priority from U.S. provisional patent application "CLUSTER CACHING WITH CONCURRENCY CHECKING", Application No. 60/316,187, filed Aug. 30, 2001, incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:
U.S. Provisional Application No. 60/305,986 entitled "DATA REPLICATION PROTOCOL," by Dean Bernard Jacobs, Reto Kramer, and Ananthan Bala Srinvasan, filed Jul. 16, 2001.
U.S. Provisional Application No. 60/316,187 entitled "CLUSTER CACHING WITH CONCURRENCY CHECKING," by Dean Bernard Jacobs et al., filed Aug. 30, 2001.
U.S. Provisional Application No. 60/316,190 entitled "METHOD FOR MAINTAINING ACCOUNT CONSISTENCY," by Dean Bernard Jacobs et al., filed Aug. 30, 2001.

FIELD OF THE INVENTION

The invention relates generally to a system for storing data. The invention relates more specifically to a system and method for caching data and checking concurrency.

BACKGROUND

When a data item is stored in a single database or data store that is accessible over a network, it is often the case that multiple servers or clients will require access to that data item. Traditionally, this requires data be read from the database each time the data item is accessed. Each read from the database is relatively resource intensive and may be relatively inefficient.

One way of overcoming some of the efficiency and scalability problems, associated with requiring a server or client to read from the database each time a data item is to be accessed, is to store the data item in cache memory. In this way, once a server or client has read a data item from the database it may simply store a copy of that item in a local cache. That local copy of the data item can then be used if future access is needed. This process may be appropriate and efficient for data items that never change, but problems arise when a data item is updated in the database.

If a data item stored in the database is updated, a copy of that data item stored in a local cache on the network may be different from the item in the database, as it will not automatically receive the update. The problem intensifies when there are multiple local copies on different servers and/or clients on the network. Since each of these local copies is created at a different time, there can be multiple versions of the data item on the network. If a user tries to update or view the data item, the copy accessed by the user may not be current and/or correct.

These problems with concurrency can have drastic consequences, such as for example when a user accesses a data item showing a bank account balance. If the local copy of the bank account balance has not been updated to show a withdrawal, for example, the bank account balance shown to the user may in fact show an incorrectly large balance. This could lead the user to unknowingly overdraw the account. Further, a third party accessing the account balance, or a device such as an ATM, would have no way of knowing that the balance being shown is incorrect.

BRIEF SUMMARY

It is therefore desirable to develop a system and method for caching data items and data objects that ensures the accuracy of the cached copy.

It is further desirable to develop a system and method to ensure that any change to a copy of a data item is not allowed unless that copy reflects the current state of the data item in the database.

Systems and methods in accordance with the present invention provide a way to maintain concurrency in data item caching. A request to update an item is received by a network server, which can store a local copy of the data item, such as in local cache. The network server can process the request using the local copy of the data item. A "conditional" or "predicated" update request can be sent from the network server to a network database, whereby the database can update the data item if the data item contains the same version of the data as the local copy. The database may not update the data item if the data item is not the same version as the local copy.

If the copies do not contain the same version, the network server can request a current copy of the data item, and can process the update request using the new copy of the data item. The network server can send another predicated update to the database. This process continues until the data item in the database is updated. Once the data item is updated, the other network servers, such as servers in a common cluster, can be notified that the data item has been updated. At this point, those network servers can drop any local copy of the data item and can request a new copy to store in local cache.

The notification to the network servers can be done by any of several appropriate methods, such as by multicasting an update message or version number to any other servers on the network. The network servers can also connect to each other directly, such as by a point-to-point protocol, or can heartbeat information to the other servers.

Other features, aspects, and objects of the invention can be obtained from a review of the specification, the figures, and the claims.

DETAILED DESCRIPTION

Systems in accordance with the present invention allow for the caching of data while maintaining concurrency across a network, such as a local area network (LAN), ethernet, or Internet. Such a system can utilize one or both of a two-part approach to updating data items while maintaining concurrency. Such systems can implement concurrent caching through any software or hardware means known or used in the computer arts, or hereinafter developed. These systems can also utilize any appropriate software applications, objects, languages, or executables, such as may be designed to utilize, for example, Java, HTML, and XML.

In the first part of one such approach in accordance with the present invention, a client or server on a network reads a data item from a database and stores a copy of the data item in a local cache. If the server or client wishes to update the data item in the database, the update can be "conditioned" or "predicated" on whether the data item stored in local cache corresponds to the current version of the data item stored in the database. This approach maintains concurrency between the client/server desiring to update the data item and the database. The caching of data in this manner can also improve performance and scalability.

Figure 1:
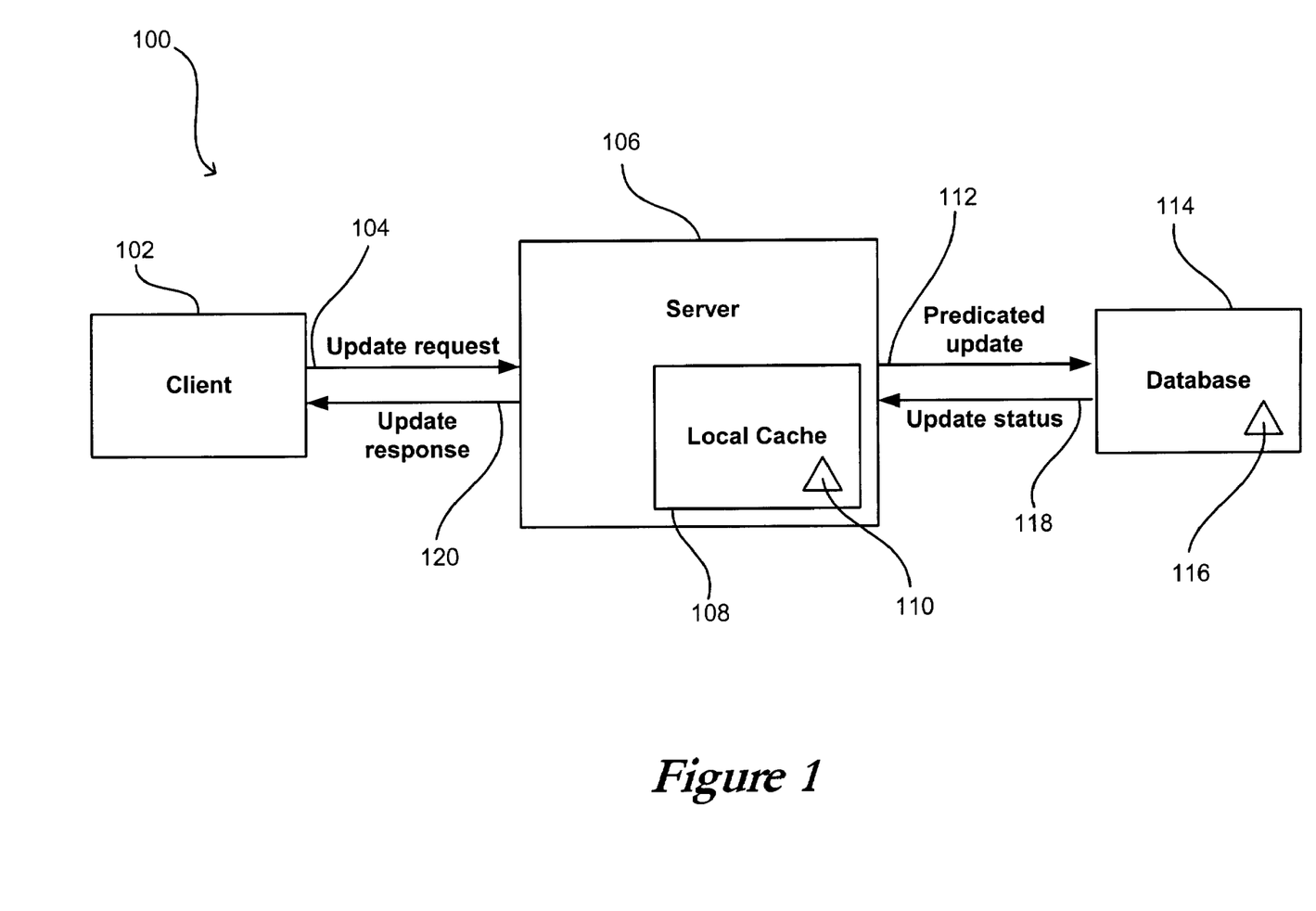
FIG. 1 is a diagram of a the first part of an approach in accordance with one embodiment of the present invention.

One example of a first part of an approach 100 is shown in FIG. 1. Here, a client 102 makes an update request 104 to a network server 106. The network server 106 in this example stores a copy of the data item 110 to be updated in a local cache 108. When the network server 106 receives the update request 104, the server 106 checks the local copy of the item 110 to see if the update may be processed. If the server 106 determines that the update may be processed using information in the local copy of the data item 110, the server 106 sends a predicated update 112 to the database 114 storing the original copy of the data item 116. If the information in the original copy of the data item 116 is the same as the information in the local copy 110, the update may be committed to the database. If the information is different, the update is not committed. The server 106 receives an update status message 118 from the database 114, indicating whether the update was committed.

If the update was committed, the server can also commit the update to the copy of the data item 110 in local cache 108. If the update was not committed, because the data items 110, 116 were out of sync, the server can drop its copy of the data item 110 from local cache 108 and request a new copy from the database 114.

Once the server 106 has the new data item, it can again send a predicated update 112 to the database 114. Alternatively, the server can send a message to the client 102 asking whether or not to attempt an update on the new data item. The server 106 can either abort the update, or continue the process of trying a predicated update and getting new copies of the data item as needed until the update is committed.

Once the update is committed or aborted, the server 106 can send an update response 120 to the client, indicating the end result of the update attempt.

The second part of this approach occurs after a client/server has updated a data item in the database. Since other clients and/or servers on the network may also have a copy of the data item stored in local cache, the client/server making the update can contact the other servers on the network to let them know that the data item has been updated. The other clients and/or servers on the network can then update a copy of the data item stored in a local cache, request a current copy of the data item, or simply drop the local copy of the data item and request a copy from the database if and when it is needed. If a copy is later requested, the copy can be stored in local cache at that time.

Figure 2:
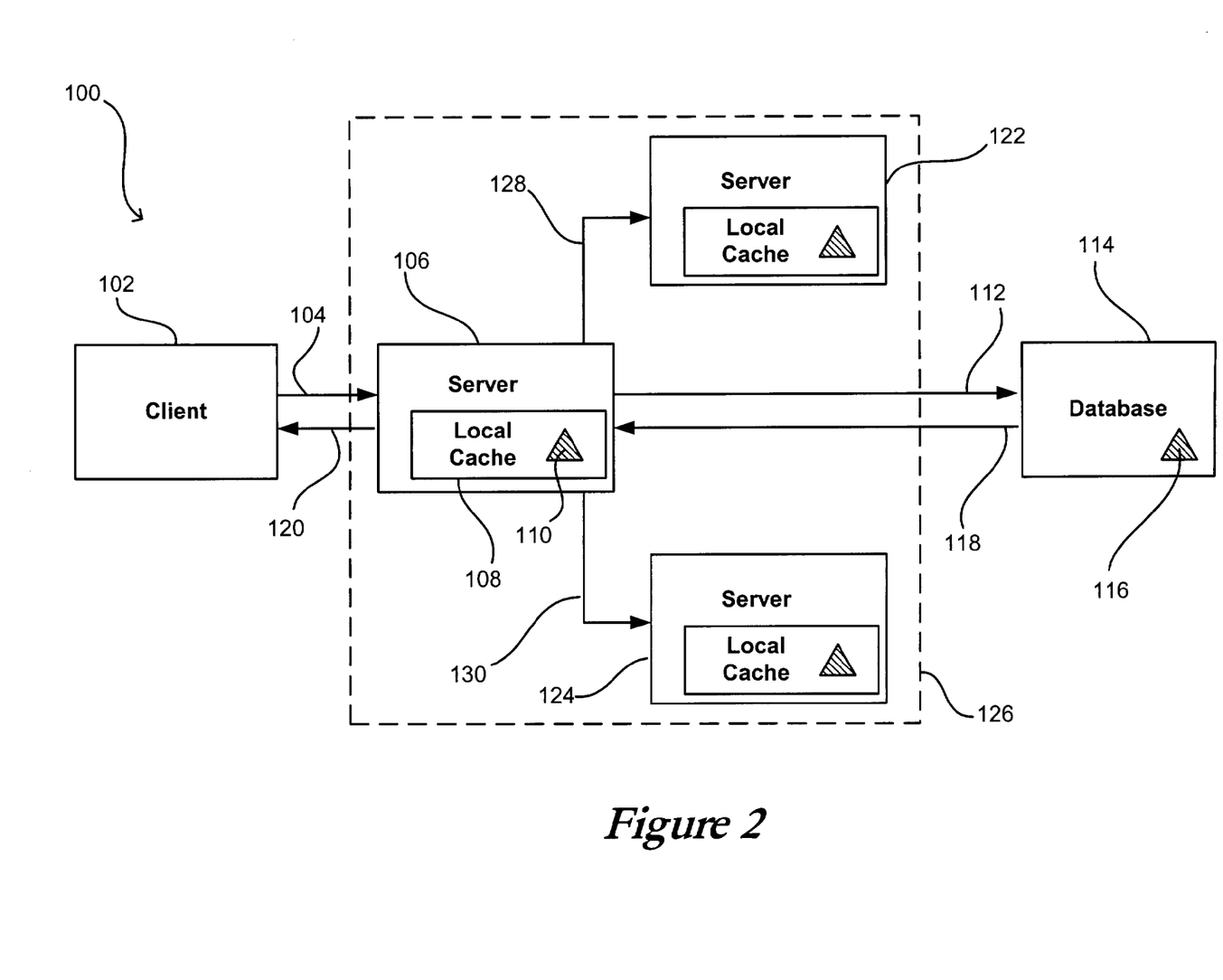
FIG. 2 is a diagram of the first and second parts of an approach in accordance with one embodiment of the present invention.

FIG. 2 shows the second stage of the approach 100 described with respect to FIG. 1. In FIG. 2, once server 106 updates the data item 116 in the database 114 and the copy of the data item 110 in local cache 108, server 106 sends update messages 128, 130 to the other servers 122, 124 in the cluster 126. These messages can take the form of point-to-point messages or multicast heartbeats, such as is described above.

For example, in a banking system, each server on the banking system network can potentially store a copy of a user's bank account balance in local cache. Each local cache can include other information about a user account, such as account information and transaction history. This information can be cached, in whole or in part, on each server on the network.

In such a system, a transaction may occur such as an ATM transaction. A server in communication with the ATM can store a cached copy of the account balance of the user initiating the transaction. If a user of the ATM wishes to withdraw $100 from a user account, for example, the server could read the balance from memory, determine whether the account contains sufficient funds for the transaction, and subtract the $100 from the account balance either before or after disbursing the funds.

In order to prevent the user from overdrawing the account, the server can first verify that the local copy of the user account balance is current with the balance stored in the database. For example, if the previous balance stored locally was $500, the server could send an update message to the database such as "update balance=$400", which could also include the current value of the account in local cache, and make the update predicated on the fact that the current account balance in the database is the same as the current balance of the account in local cache.

If the account balance stored in the database is not the same as the balance in local cache, the server may roll back the update. Once an update is rolled back, the server can drop its copy in local cache, read the account information from the database, then attempt the update again. For example, if the local copy of the account balance said that the balance was $500, and the database reflected a balance of $1000, the server would roll back the $400 update attempt and try a predicated $900 update, subtracting the $100 withdrawal from the current $1000 balance. This second update can again be predicated on the fact that the account balance has not changed since it was last read by the server. This process continues until either the account balance is updated appropriately, or the transaction is aborted due to insufficient funds, etc.

If a server succeeds in updating a data item in the database, it can also update the copy in local cache, such that the local copy is current with the version of the data item in the database. For a network in which multiple servers (or clients) can have a copy of the data item in a local cache, the server updating the data item can notify the other servers that the data item has been updated. This can include any or all other servers or clients on a network, in a domain, in a cluster, or in any other network grouping. This notification can be accomplished in any of a number of ways, such as by a point-to-point connection with each server/client, by multicasting, by a one-phase distribution method, by a two-phase distribution method, by heartbeating an update or a delta, or any other appropriate messaging technique.

It may be desirable that the sending of the notification is both reliable in the face of failures and scalable, such that the process makes efficient use of the network. One simple approach is to have the server updating the data item ("updating server") individually contact each server or client on the network ("network server") and transfer a message over a point-to-point link, such as a TCP/IP connection. The message can tell these network servers that the data item has been updated, and that the network servers should drop any copy of this data item in local cache. This approach may lead to inconsistent copies of the data if one or more of the network servers are temporarily unreachable, or if the network servers encounter an error in processing the update.

Figure 3:
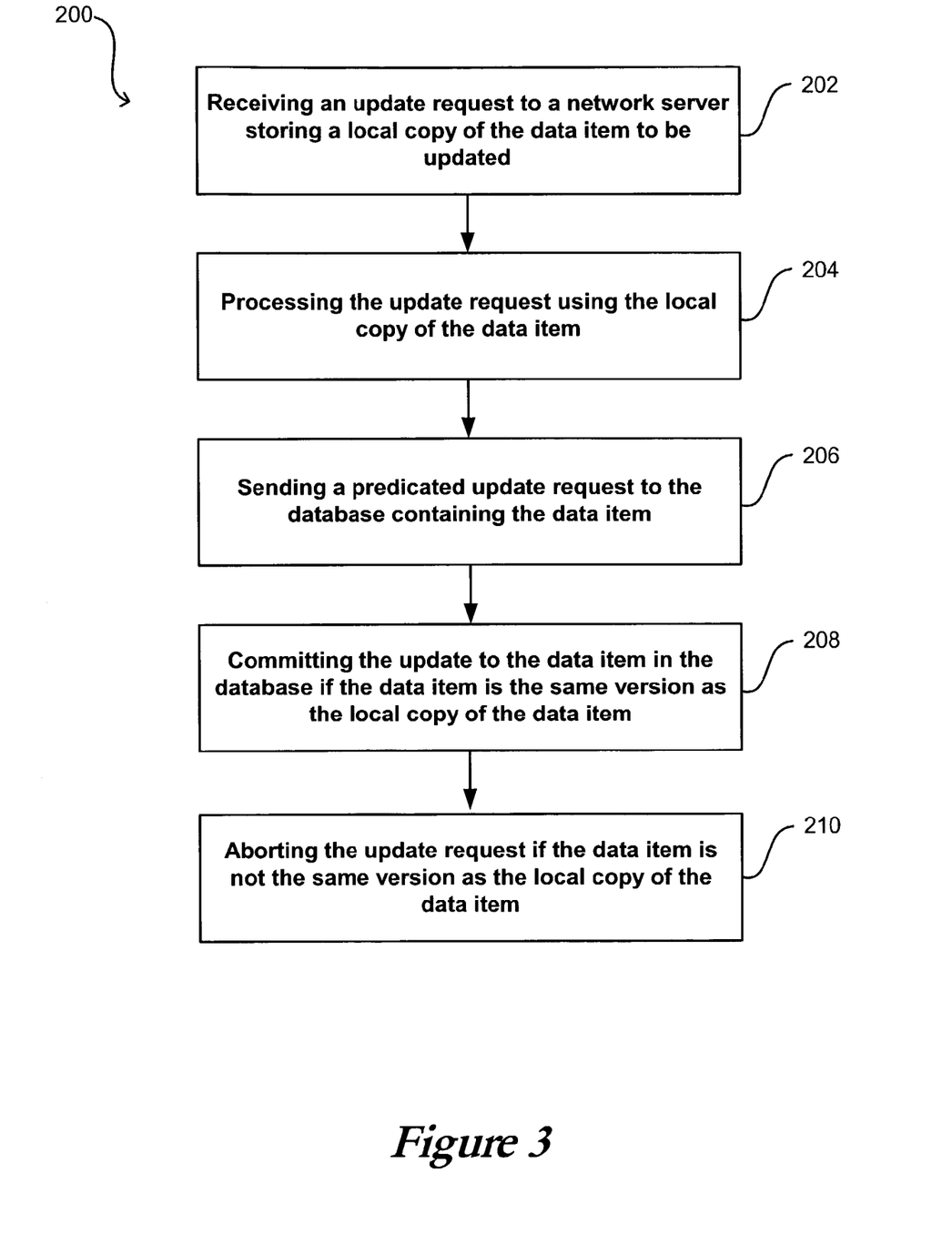
FIG. 3 is a flowchart for an update process in accordance with one embodiment of the present invention.
Figure 4:
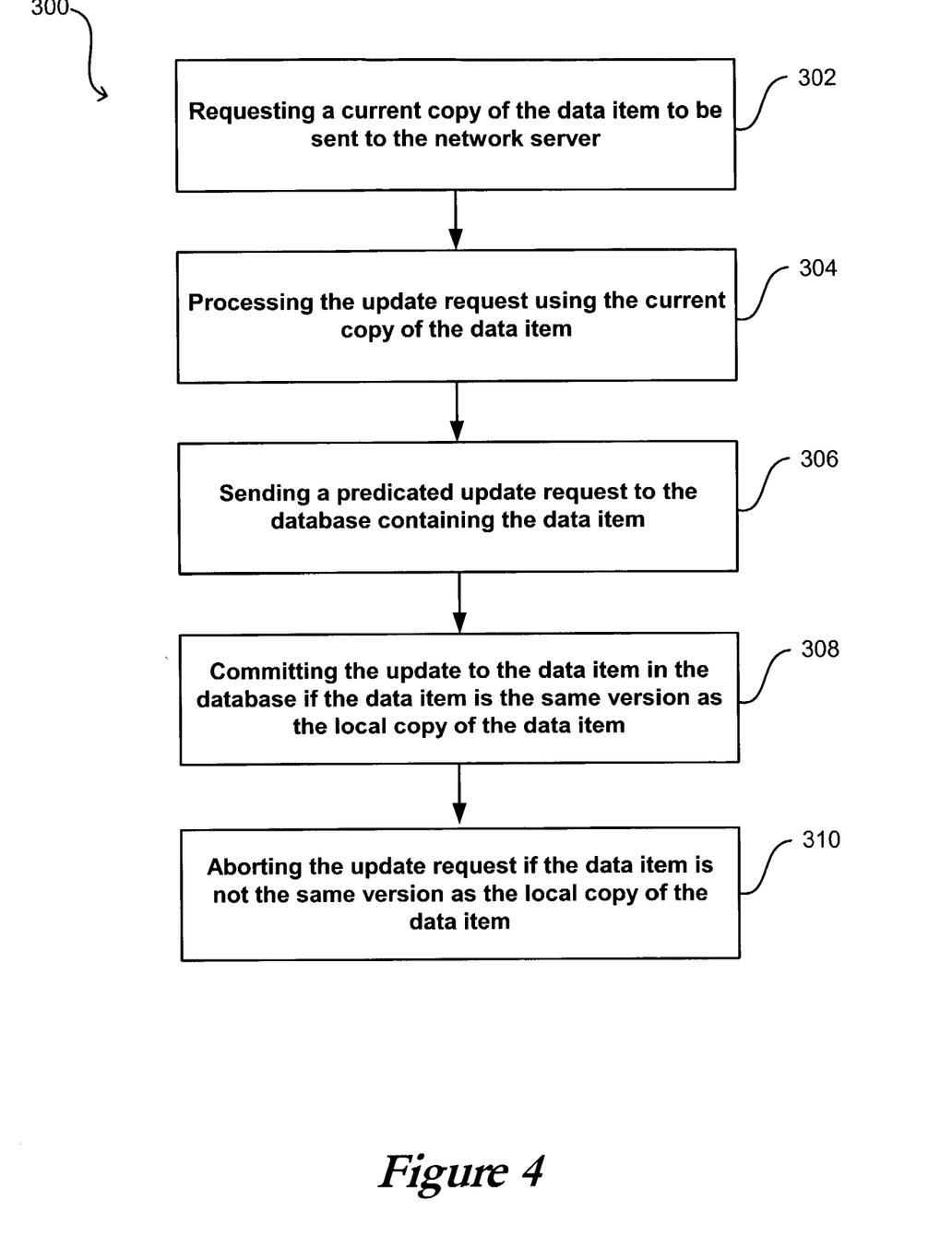
FIG. 4 is a flowchart for a process for updating a data item when the local copy and original copy are out-of-sync, in accordance with one embodiment of the present invention.
Figure 5:
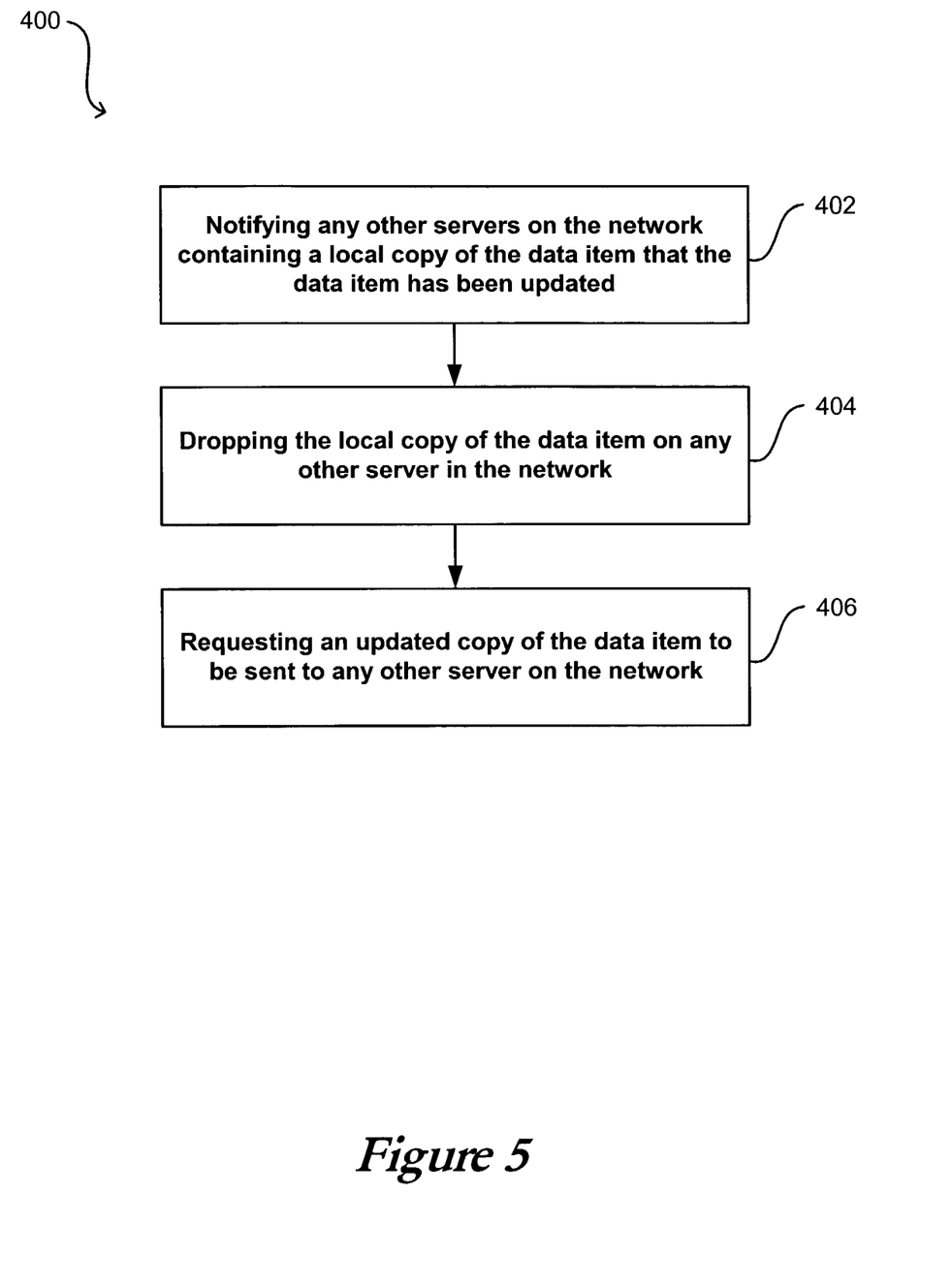
FIG. 5 is a flowchart for a process for updating network servers on the network, in accordance with one embodiment of the present invention.

Steps in a general process that can be used in accordance with the present invention are shown in FIGS. 3–5. In the process 200 of FIG. 3, an update request is received, such as from a client, to a network server storing a local copy of the data item to be updated 202. The update is processed by the network server using the local copy of the data item 204. A predicated update request is sent from the network server to the network database containing the original copy of the data item 206. If the original copy and local copy of the data item contain the same version of the data item, the update request is committed 208. If not, the predicated update request is aborted 210.

FIG. 4 shows a process 300 that can be used if the predicated update request is aborted. The network server can request a current copy of the data item 302. The network server can then process the update request using the current copy of the data item 304. A predicated update request is again sent from the network server to the network database containing the original copy of the data item 306. If the original copy and current copy of the data item contain the same version of the data item, the update request is committed 308. If not, the predicated update request is again aborted 310 and the process 300 may be repeated until the update is committed.

FIG. 5 shows a process 400 that may be used once the update is committed. Any other servers on the network, such as servers in the scope of an update or servers in a common cluster or domain, are notified that the data item is being updated 402. Any server that is notified then drops any local copy of the data item being stored, such as in a local cache 404. Those servers may choose to request an updated copy of the data item, either soon after dropping the local copy or upon receiving a subsequent request relating to that data item 406.

In the case of a two-phase commit, any other servers on the network, such as in the scope of an update or in the same cluster, can be notified that an item is being updated during the commit. For example, an update can first go through a prepare stage in which it is determined whether or not the update can be successfully committed. During this phase, or at least before the update is committed, any server that is notified of the update can veto the commit. By vetoing the commit, any preparation is rolled back and the update does not get written to the database. If the update successfully goes through a prepare phase, and does not get vetoed by a server, the update can get committed to the data item in the database.

The sending of the notification can also be sent by multicasting the notification to the other servers/clients that might be caching a local copy of the data item. Multicasting in this instance may comprise the updating server sending the notification once to the network/cluster/domain, which is then passed to the network servers/clients. In simple multicasting, the message is only sent once, such that a server that does not receive the update may fail to drop the outdated copy of the item. This can result in that server having to go through two or more iterations of predicated update attempts for that data item when processing a subsequent request.

The sending of the notification can also be sent through a "heartbeat." A heartbeat in this approach is a periodic message, typically multicast although other messaging means may be utilized, that is sent to servers/clients that might be storing a local copy of the data item. An updating server can continue to heartbeat the latest update(s) for a given period of time, for a given number of heartbeats, until each server/client responds it has received the heartbeat, or any other appropriate measure.

Each update to a data item can be packaged as an incremental delta between versions. A protocol in accordance with the present invention may integrate two methods for the distribution of updates, although other appropriate methods can be used accordingly. These distribution methods are referred to as a one-phase method and a two-phase method, and provide a tradeoff between consistency and scalability. In a one-phase method, which can favor scalability, each of the network servers obtains and processes updates at its own pace. The network servers get updates from an updating server at different times, but commit to each update as soon as the update is received. One of the network servers can encounter an error in processing an update, but in the one-phase method this does not prevent the network servers from processing the update.

In a two-phase method in accordance with the present invention, which can favor consistency, the distribution is "atomic," in that either all or none of the network servers successfully process the update. There are separate phases, such as prepare and commit phases, which can allow for a possibility of abort. In the prepare phase, the updating server determines whether each of the network servers can take the update. If all the network servers indicate that they can accept the update, the new data is sent to the network servers to be committed in the commit phase. If at least one of the network servers cannot take the update, the update can be aborted, resulting in no commit. In this case, an updating server is informed that it should roll back the prepare and nothing is changed. Such a protocol in accordance with the present invention is reliable, as one of the network servers that is unreachable when an update is committed, in either method, eventually gets the update.

A system in accordance with the present invention can also ensure that a temporarily unavailable server eventually receives all updates. For example, a server may be temporarily isolated from the network, then come back into the network without restarting. Since the server is not restarting, it normally would not check for updates. The server coming back into the network can be accounted for by having the server check periodically for new updates, or by having an updating server check periodically to see whether the network servers have received the updates.

In one embodiment, an updating server regularly sends multicast "heartbeats" to the network servers, such as for a given period of time or a given number of heartbeats. Since a multicast approach can be unreliable, it is possible for one of the network servers to miss arbitrary sequences of heartbeats. For this reason, heartbeats can contain a window of information about recent updates. Such information about previous updates can be used to reduce the amount of network traffic, as explained below. In an example such as an account balance, historical information may not be necessary, such that a heartbeat may simply contain the current balance.

The updating server can continue to periodically send a multicast heartbeat containing the version number to the network servers. This allows any server that was unavailable, or unable to receive and process a delta, to determine that it is not on the current version of the data item and request a delta or update at a later time, such as when the slave comes back into the system. If the current value is contained in the heartbeat, the server may simply commit the new value.

Figure 6:
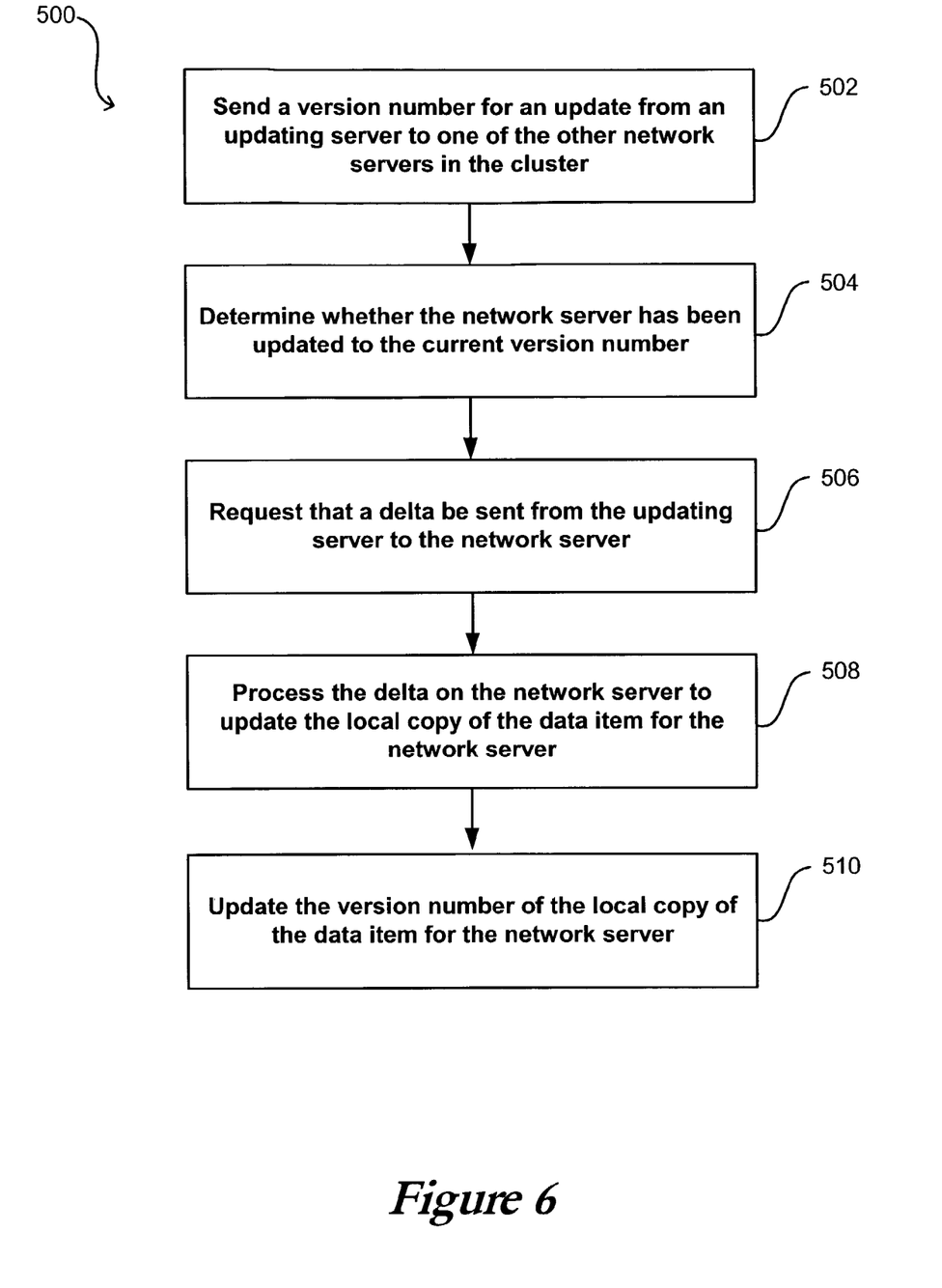
FIG. 6 is a flowchart for a one phase process in accordance with one embodiment of the present invention.

For an update in a one-phase method, these heartbeats can cause each of the network servers to request a delta starting from that server's current version of the data item. Such a process is shown in the flowchart of FIG. 6. In this basic process 500 a version number for the current data item on the updating server, or in the database, is sent from the updating server to one of the other network servers 502. The network server determines whether it has been updated to the current version number 504. If the network server is not on the current version, it requests that a delta be sent from the updating server containing the information needed to update the data item 506. When the delta is sent, the network server processes the delta in order to update to the current version 508. The network server also updates its version number for the data item to the current version number 510.

Figure 7:
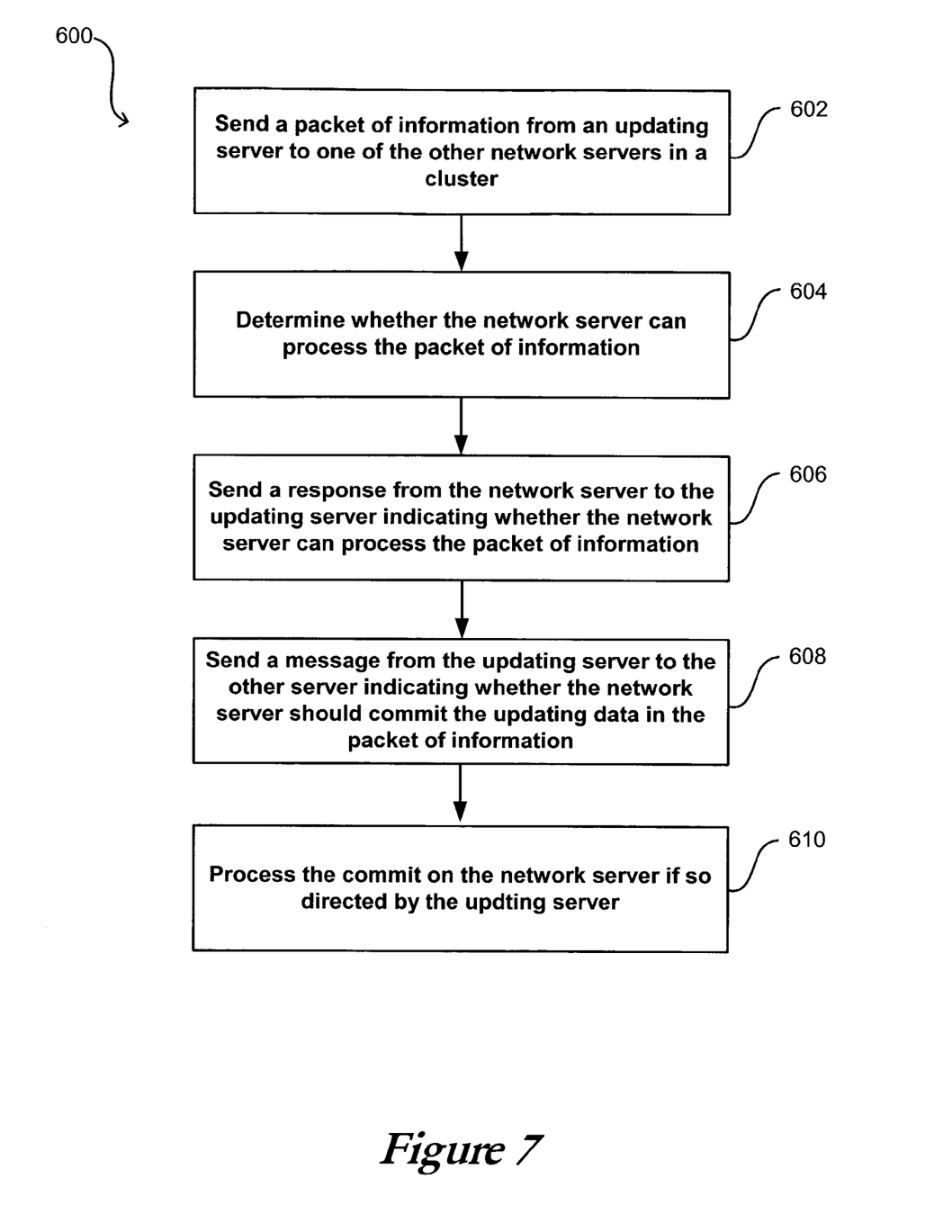
FIG. 7 is a flowchart for a two phase process in accordance with one embodiment of the present invention.

For an update in a two-phase method, the updating server can begin with a prepare phase in which it pro-actively sends each of the network servers a delta from the immediately-previous version. Such a process is shown in the flowchart of FIG. 7. In this basic process 600, a packet of information is sent from the updating server to at least one other network server 602. Each of the network servers receiving the packet determines whether it can process that packet and update to the current version 604. Each server receiving the packet responds to the updating server, indicating whether the network server can process the packet 606. If all the network servers (to which the delta is sent) acknowledge successful processing of the delta within some timeout period, the updating server can decide to commit the update. Otherwise, the updating server can decide to abort the update. Once this decision is made, the updating server sends a message to the network server(s) indicating whether the update should be committed or aborted 608. If the decision is to commit, each of the network servers processes the commit 610. Heartbeats can further be used to signal whether a commit or abort occurred, in case the command was missed by one of the slaves.

In addition to the ability of a server to pull a delta, an updating server can have the ability to push a delta during two-phase distribution. In one embodiment, these deltas are always between successive versions of the data. This two-phase distribution method can minimize the likelihood of inconsistencies between participants. Servers can process a prepare as far as possible without exposing the update to clients or making the update impossible to roll back. This may include such tasks as checking the servers for conflicts. If any of the servers signals an error, such as by sending a "disk full" or "inconsistent configuration" message, the update can be uniformly rolled back.

It is still possible, however, that inconsistencies may arise. For instance, there may be errors in processing a commit, for reasons such as an inability to open a socket. Servers may also commit and expose the update at different times. Because the data cannot reach every managed server at exactly the same time, there can be some rippling effect. The use of multicasting provides for a small time window, in an attempt to minimize the rippling effect. In one embodiment, a prepared server will abort if it misses a commit, whether it missed the signal, the master crashed, etc.

A best-effort approach to multicasting can cause a server to miss a commit signal. If an updating server crashes part way through the commit phase, there may be no logging or means for recovery. There may be no way for the updating server to tell the remaining servers that they need to commit. Upon abort, some servers may end up committing the data if the version is not properly rolled back. In one embodiment, the remaining servers could get the update using one-phase distribution. This might happen, for example, when a server pulls a delta in response to a heartbeat received from an updating server. This approach may maintain system scalability, which might be lost if the system tied down distribution in order to avoid any commit or version errors.

If the information regarding the previous versions was not included in a delta, a server might have to abort and restart if that server was prepared but missed a commit. With the inclusion of older version information, the server can commit that portion of the update it was expecting upon the prepare, and ask for a new delta to handle more recent updates. Information about a given version can be included for at least some fixed, configurable number of heartbeats, although rapid-fire updates may cause the window to increase to an unacceptable size. In another embodiment, information about an older version is discarded once an updating server determines that all network servers have received the update.

Multicast heartbeats can have several properties that need to be taken into consideration. These heartbeats can be asynchronous or "one-way". As a result, by the time a server responds to a heartbeat, the updating server or database may have advanced to a new state. Further, not all servers respond at exactly the same time. As such, an updating server can assume that a server has no knowledge of its state, and can include that which the delta is intended to update.

These heartbeats can also be unreliable, as a slave may miss arbitrary sequences of heartbeats. This can again lead to the inclusion of older version information in the heartbeats. In one embodiment, heartbeats are received by a server in the order in which they were sent. For example, a server may not commit version seven until it has committed version six. The server can wait until it receives six, or it can simply throw out six and commit seven. This ordering eliminates the possibility for confusion that might be created by versions going backwards.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer implemented method for updating a data item in a cluster of application servers, comprising:
   processing an update request on an application server of a cluster of application servers, the application server storing a local copy of a data item at a local cache to be used in processing the request;
   sending a predicated update request to a database containing the data item, whereby the database updates the data item if the local copy at the local cache is current with the data item before the update, and whereby the database does not update the data item if the local copy is not current with the data item before the update;
   requesting a current copy of the data item for the application server and sending another predicated update if the local copy is not current with the data item in the database, the step of requesting a current copy and sending another predicated update continuing until the database updating the data item and the method being terminated; and
   notifying other application servers in the cluster of application servers that the data has been updated, further comprising at least one of the additional limitations (a)–(f)
   (a) multicasting an update message to the other application servers in the cluster of application servers that might be storing a local copy of the data item, as part of the notifying step;
   (b) multicasting a version number for the data item to the other application servers in the cluster of application servers after the data item is updated, as part of the notifying step;
   (c) contacting one of the other application servers in the cluster of application servers by a point-to-point connection to indicate that the data item has been updated, as part of the notifying step;
   (d) heartbeating the version number for the data item to the other application servers in the cluster of application servers after the data item is updated, as part of the notifying step;
   (e) dropping a local copy of the data item on one of the other application servers in the cluster of application servers after being notified that the data item has been updated;
   (f) requesting an updated copy of the data item to one of the other application servers in the cluster of application servers after being notified that the data item has been updated.

2. A computer implemented method according to claim 1, further comprising:
   receiving a message from the database to the application server indicating whether the data item has been updated.

3. A computer implemented method according to claim 1, further comprising:
   reading a data item from the database and storing a local copy of the data item in the local cache.

4. A computer implemented method according to claim 1, further comprising:
   receiving an update request from a client to the application server.

5. A computer implemented method according to claim 1, further comprising:
   checking the local copy to determine whether the update request can be processed.

6. A Currently amended method according to claim 1, further comprising:
   updating the local copy at the local cache if the data item in the database is updated.

7. A computer implemented method according to claim 1, further comprising:
   deleting the local copy and storing a new copy of the data item at the local cache if the local copy is not current with the data item.

8. A Currently amended method according to claim 7, further comprising:
   sending an additional predicated update request to a cluster database containing the data item, whereby the database updates the data item if the new copy is current with the data item before the update, and whereby the database does not update the data item if the new copy is not current with the data item before the update.

9. A computer implemented method according to claim 7, further comprising:
   determining whether the client initiating the update request wishes to attempt the update with the data item current with the new copy.

10. A computer implemented method according to claim 1, further comprising:
    deleting a local copy of the data item on any application server being notified the data item has been updated.

11. A computer implemented method according to claim 1, further comprising:
    notifying another application server in the cluster of application servers that the data item in the database is going to be updated.

12. A computer implemented method according to claim 11, further comprising:
    allowing said another application server to veto the update of the data item in the database.

13. A computer implemented method according to claim 1, further comprising:
    sending a packet of information to another application server in the cluster, the packet of information containing changes to the data item due to the update.

14. A computer implemented method according to claim 13, wherein:
    the packet of information contains changes between the state of the data item after the update and the prior state of the data item before the update.

15. A computer implemented method according to claim 1, further comprising:
    determining whether at least one of the other application servers in the cluster can accept the update to the data item; and
    committing the update to the at least one of the other application servers if the at least one of the other application servers can accept the update.

16. A computer implemented method according to claim 15, further comprising:
    rolling back the update if the at least one of the other application servers cannot accept the update.

17. The computer implemented method of claim 1, wherein the at least one limitation is limitation (a).

18. The computer implemented method of claim 1, wherein the at least one limitation is limitation (b).

19. The computer implemented method of claim 1, wherein the at least one limitation is limitation (c).

20. The computer implemented method of claim 1, wherein the at least one limitation is limitation (d).

21. The computer implemented method of claim 1, wherein the at least one limitation is limitation (e).

22. The computer implemented method of claim 1, wherein the at least one limitation is limitation (f).

23. The computer implemented method of claim 1, wherein at least two limitations of limitations (a)–(f) are done.

24. A computer implemented method for maintaining concurrency for a copy of a data item cached on a application server in a cluster of application servers, comprising:
  receiving an update request, the update request being received by a application server in a cluster of application servers storing a local copy of a data item in local cache;
  processing the request using the local copy of the data item;
  sending a predicated update request to a database storing the data item, whereby the database updates the data item if the data item is current with the local copy, and whereby the database does not update the data item if the data item is not current with the local copy;
  requesting a current copy of the data item for the application server and sending another predicated update if the local copy is not current with the data item in the database, the step of requesting a current copy and sending another predicated update continuing until the database updating the data item and the method being terminated; and
  notifying other application servers in the cluster that the data item in the database has been updated, further comprising at least one of the additional limitations (a)–(f)
  (a) multicasting an update message to the other application servers in the cluster of application servers that might be storing a local copy of the data item, as part of the notifying step;
  (b) multicasting a version number for the data item to the other application servers in the cluster of application servers after the data item is updated, as part of the notifying step;
  (c) contacting one of the other application servers in the cluster of application servers by a point-to-point connection to indicate that the data item has been updated, as part of the notifying step;
  (d) heartbeating the version number for the data item to the other application servers in the cluster of application servers after the data item is updated, as part of the notifying step;
  (e) dropping a local copy of the data item on one of the other application servers in the cluster of application servers after being notified that the data item has been updated;
  (f) requesting an updated copy of the data item to one of the other application servers in the cluster of application servers after being notified that the data item has been updated.

25. The computer implemented method of claim 24, wherein the at least one limitation is limitation (a).

26. The computer implemented method of claim 24, wherein the at least one limitation is limitation (b).

27. The computer implemented method of claim 24, wherein the at least one limitation is limitation (c).

28. The computer implemented method of claim 24, wherein the at least one limitation is limitation (d).

29. The computer implemented method of claim 24, wherein the at least one limitation is limitation (e).

30. The computer implemented method of claim 24, wherein the at least one limitation is limitation (f).

31. The computer implemented method of claim 24, wherein at least two limitations of limitations (a)–(f) are done.

32. A computer-readable storage medium including code for execution by a server computer for updating a data item on a computer network, comprising:
  means for processing an update request on an application server of a cluster of application servers, the application server storing a local copy of a data item to be used in processing the request at a local cache;
  means for sending a predicated update request to a database containing the data item, whereby the database updates the data item if the local copy is current with the data item before the update, and whereby the database does not update the data item if the local copy is not current with the data item before the update;
  requesting a current copy of the data item for the application server and sending another predicated update if the local copy is not current with the data item in the database, the step of requesting a current copy and sending another predicated update continuing until the database updating the data item and the method being terminated; and
  means for notifying other application servers in the cluster of application servers that the data has been updated, further comprising means for doing at least one of the additional limitations (a)–(f)
  (a) multicasting an update message to the other application servers in the cluster of application servers that might be storing a local copy of the data item, as part of the notifying means;
  (b) multicasting a version number for the data item to the other application servers in the cluster of application servers after the data item is updated, as part of the notifying means;
  (c) contacting one of the other application servers in the cluster of application servers by a point-to-point connection to indicate that the data item has been updated, as part of the notifying means;
  (d) heartbeating the version number for the data item to the other application servers in the cluster of application servers after the data item is updated, as part of the notifying means;
  (e) dropping a local copy of the data item on one of the other application servers in the cluster of application servers after being notified that the data item has been updated;
  (f) requesting an updated copy of the data item to one of the other application servers in the cluster of application servers after being notified that the data item has been updated.

33. The computer program product of claim 32, wherein the at least one limitation is limitation (a).

34. The computer program product of claim 32, wherein the at least one limitation is limitation (b).

35. The computer program product of claim 32, wherein the at least one limitation is limitation (c).

36. The computer program product of claim 32, wherein the at least one limitation is limitation (d).

37. The computer program product of claim 32, wherein the at least one limitation is limitation (e).

38. The computer program product of claim 32, wherein the at least one limitation is limitation (f).

39. The computer program product of claim 32, wherein at least two limitations of limitations (a)–(f) are done.

40. A computer program product for execution by a server computer for updating a data item on a computer network, comprising:
   computer code that can process an update request on an application server of a cluster of application servers, the application server storing a local copy of a data item to be used in processing the request at a local cache;
   computer code that can send a predicated update request to a cluster database containing the data item, whereby the database updates the data item if the local copy is current with the data item before the update, and whereby the database does not update the data item if the local copy is not current with the data item before the update;
   requesting a current copy of the data item for the application server and sending another predicated update if the local copy is not current with the data item in the database, the step of requesting a current copy and sending another predicated update continuing until the database updating the data item and the method being terminated; and
   computer code for notifying other application servers in the cluster of application servers that the data has been updated, further comprising computer code for doing at least one of the additional limitations (a)–(f)
   (a) multicasting an update message to the other application servers in the cluster of application servers that might be storing a local copy of the data item, as part of the notifying computer code;
   (b) multicasting a version number for the data item to the other application servers in the cluster of application servers after the data item is updated, as part of the notifying computer code;
   (c) contacting one of the other application servers in the cluster of application servers by a point-to-point connection to indicate that the data item has been updated, as part of the notifying computer code;
   (d) heartbeating the version number for the data item to the other application servers in the cluster of application servers after the data item is updated, as part of the notifying computer code;
   (e) dropping a local copy of the data item on one of the other application servers in the cluster of application servers after being notified that the data item has been updated;
   (f) requesting an updated copy of the data item to one of the other application servers in the cluster of application servers after being notified that the data item has been updated.

41. A computer implemented system for updating a data item on a network, comprising:
   means for processing an update request on an application server of a cluster of application servers, the application server storing a local copy of a data item to be used in processing the request at a local cache;
   means for sending a predicated update request to a database containing the data item, whereby the database updates the data item if the local copy is current with the data item before the update, and whereby the database does not update the data item if the local copy is not current with the data item before the update;
   requesting a current copy of the data item for the application server and sending another predicated update if the local copy is not current with the data item in the database, the step of requesting a current copy and sending another predicated update continuing until the database updating the data item and the method being terminated; and
   means for notifying other application servers in the cluster of application servers that the data has been updated, further comprising means f or doing at least one of the additional limitations (a)–(f)
   (a) multicasting an update message to the other application servers in the cluster of application servers that might be storing a local copy of the data item, as part of the notifying means;
   (b) multicasting a version number for the data item to the other application servers in the cluster of application servers after the data item is updated, as part of the notifying means;
   (c) contacting one of the other application servers in the cluster of application servers by a point-to-point connection to indicate that the data item has been updated, as part of the notifying means;
   (d) heartbeating the version number for the data item to the other application servers in the cluster of application servers after the data item is updated, as part of the notifying means;
   (e) dropping a local copy of the data item on one of the other application servers in the cluster of application servers after being notified that the data item has been updated;
   (f) requesting an updated copy of the data item to one of the other application servers in the cluster of application servers after being notified that the data item has been updated.

42. A computer implemented system comprising: a processor; object code executed by said processor, said object code configured to:
   process an update request on an application server of a cluster of application servers, the cluster server storing a local copy of a data item to be used in processing the request at a local cache;
   send a predicated update request to a database containing the data item, whereby the database updates the data item if the local copy is current with the data item before the update, and whereby the database does not update the data item if the local copy is not current with the data item before the update;
   requesting a current copy of the data item for the application server and sending another predicated update if the local copy is not current with the data item in the database, the step of requesting a current copy and sending another predicated update continuing until the database updating the data item and the method being terminated; and
   notify other application servers in the cluster of application servers that the data has been updated, further comprising doing at least one of the additional limitations (a)–(f)
   (a) multicasting an update message to the other application servers in the cluster of application servers that might be storing a local copy of the data item, as part of the notifying step;
   (b) multicasting a version number for the data item to the other application servers in the cluster of application servers after the data item is updated, as part of the notifying step;
   (c) contacting one of the other application servers in the cluster of application servers by a point-to-point con nection to indicate that the data item has been updated, as part of the notifying step;

(d) heartbeating the version number for the data item to the other application servers in the cluster of application servers after the data item is updated, as part of the notifying step;

(e) dropping a local copy of the data item on one of the other application servers in the cluster of application servers after being notified that the data item has been updated;

(f) requesting an updated copy of the data item to one of the other application servers in the cluster of application servers after being notified that the data item has been updated.

* * * * *

UNITED STATES PATENT AND TRADEMARK OFFICE
CERTIFICATE OF CORRECTION

PATENT NO. : 7,028,030 B2
APPLICATION NO. : 10/211713
DATED : April 11, 2006
INVENTOR(S) : Dean Jacobs Page 1 of 1

It is certified that error appears in the above-identified patent and that said Letters Patent is hereby corrected as shown below:

Col. 10
In claim 6, at line 1, delete "Currently amended" and insert --computer implemented--.

In claim 8, at line 1, delete "Currently amended" and insert --computer implemented--.

Signed and Sealed this

Twentieth Day of January, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,028,030 B2 | Page 1 of 1 |
| APPLICATION NO. | : 10/211713 | |
| DATED | : April 11, 2006 | |
| INVENTOR(S) | : Dean Jacobs | |

It is certified that error appears in the above-identified patent and that said Letters Patent is hereby corrected as shown below:

Col. 10
In claim 6, at line 3, delete "Currently amended" and insert --computer implemented--.

In claim 8, at line 12, delete "Currently amended" and insert --computer implemented--.

This certificate supersedes the Certificate of Correction issued January 20, 2009.

Signed and Sealed this

Seventeenth Day of February, 2009

JOHN DOLL
*Acting Director of the United States Patent and Trademark Office*